Figure 1:
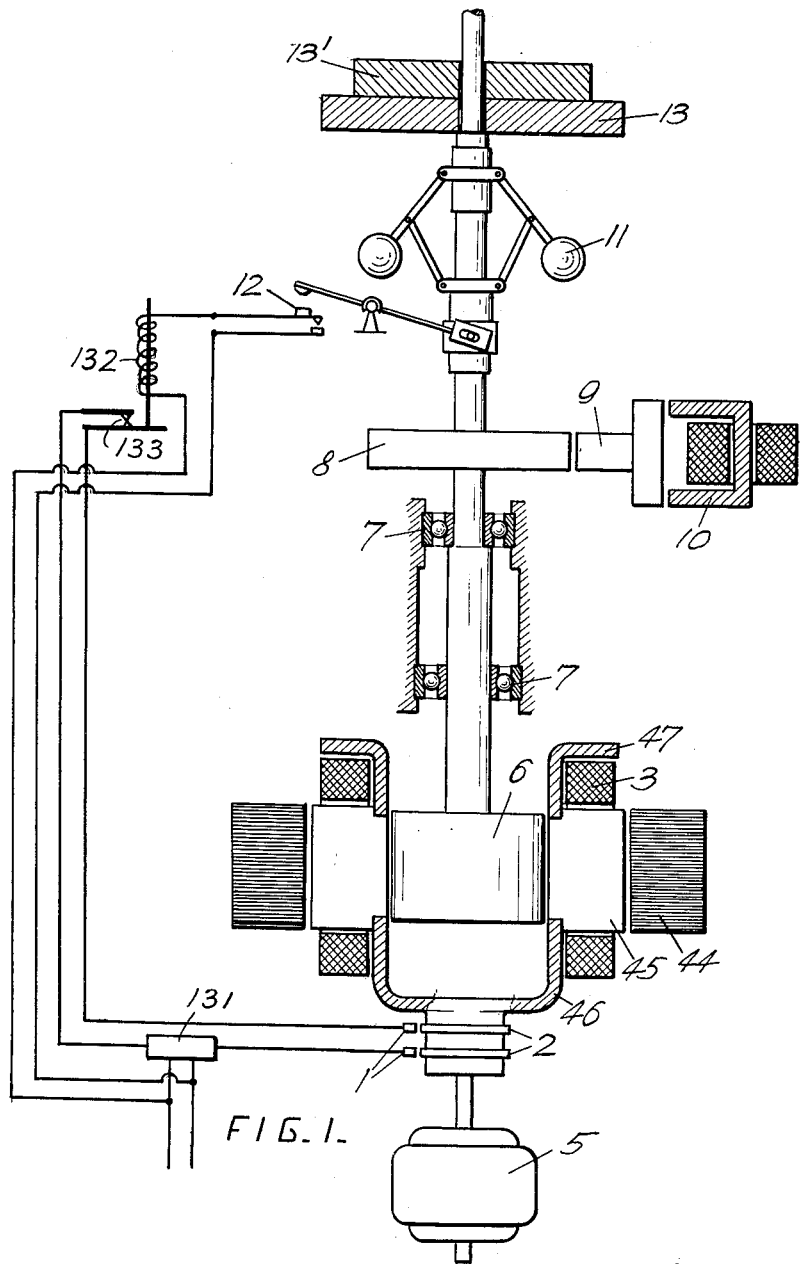

Feb. 19, 1952 J. STIVIN 2,586,577
DYNAMOELECTRIC POWER MEASURING CUTOFF
Filed Sept. 2, 1948 2 SHEETS—SHEET 1

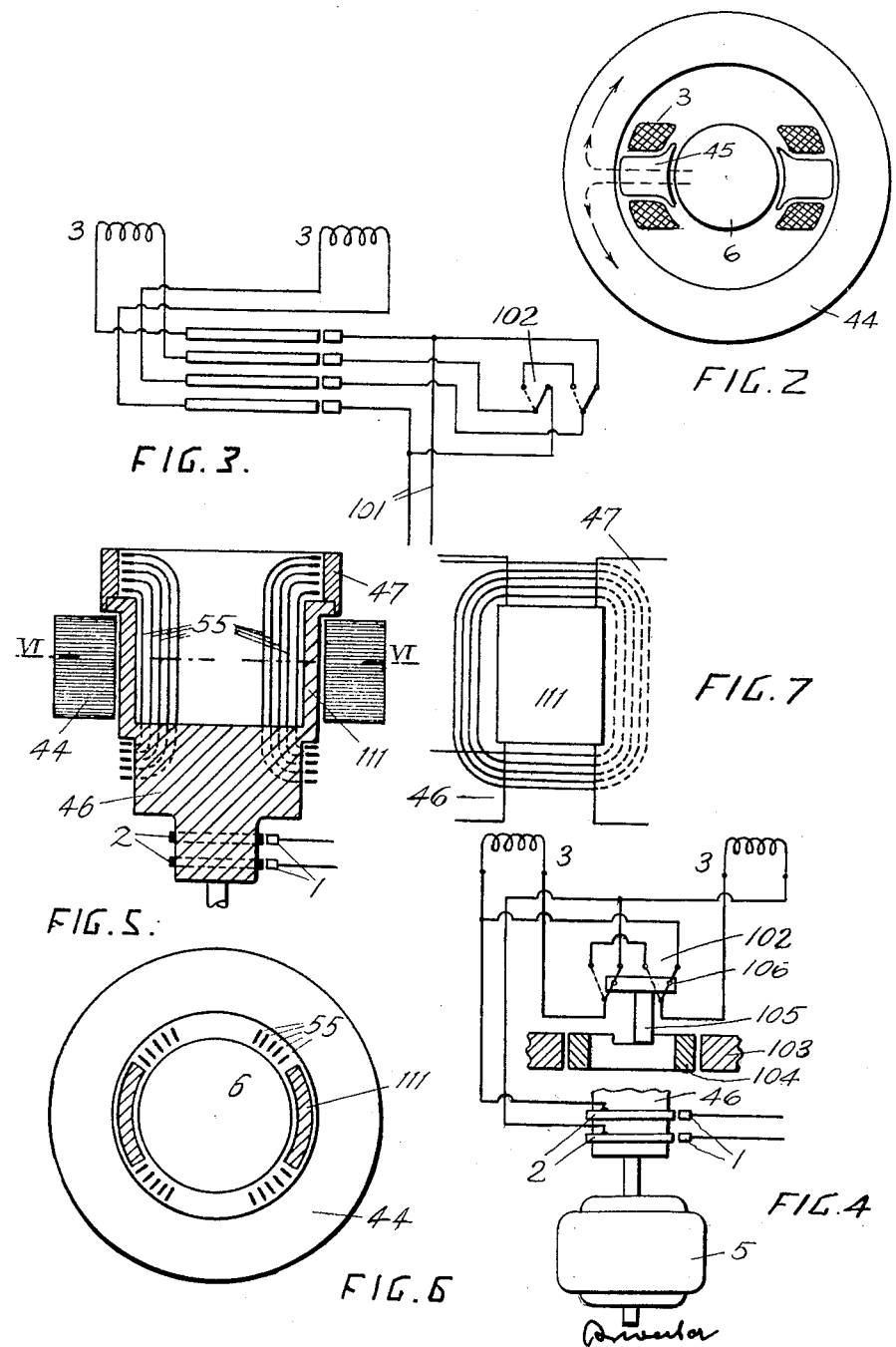

Patented Feb. 19, 1952

2,586,577

UNITED STATES PATENT OFFICE 2,586,577

DYNAMOELECTRIC POWER MEASURING CUTOFF

Jiří Stivín, Rychnov, near Jablonec n. N., Czechoslovakia

Application September 2, 1948, Serial No. 47,504
In Czechoslovakia September 5, 1947

13 Claims. (Cl. 171—252)

The present invention relates to a device for measuring a selectively predetermined amount of electric energy, and is an improvement in or modification of the invention according to application Ser. No. 730,830, Patent No. 2,491,340, issued December 13, 1949.

In U. S. Patent No. 2,491,340, issued December 13, 1949, a device for measuring a selectively predetermined amount of electric energy is shown which contains in combination a rotatable armature, a rotatable magnet surrounding a portion of said armature, but spaced therefrom and including windings and terminals for interconnection to an electric source, means connected to said magnet for revolving the same about the axis of said armature, whereby said armature will be rotated about its axis when current passes through said windings, means connected with relation to said armature for selectively adjusting the angular acceleration thereof, and means actuable by said armature for indicating the amount of energy absorbed by the device. As means connected with relation to said armature for selectively adjusting the angular acceleration thereof, one or more flywheels detachably secured with relation to said armature could be used and as means actuable by said armature for indicating the amount of energy absorbed by the device a governor could be used associated with said armature for indicating the angular velocity of the same, and adapted to cut off the flow of electric current when said armature reaches a predetermined velocity. The main patent discloses further an arrangement in which the rotatable armature is replaced by two rotatable armatures, brought in the rotation in opposite directions in the same manner so as to integrate the supplied output.

In the example of carrying out the device shown and described in the main patent, the mechanically revolved rotor consists of an annular body provided with inwardly extending pole extensions, carrying magnetising coils.

It has, however, been found in connection with such device, that even if material of highest quality is used for the rotor, there remains in some cases residual magnetism in the material of the rotor after the device has been used, said magnetism being liable to cause irregularities in measuring the required amount of electric energy.

According to the present invention this drawback is removed by making the annular rotor body itself stationary, while the pole extensions only are rotatable, said pole extensions having a far smaller mass and therefore a far smaller residual magnetism than the entire rotor. Such pole extensions may carry magnetising coils in the usual way.

According to a further feature of the invention the magnetising coils are adapted to be switched over so as to be connected either in series or in parallel, which provision serves for changing the entraining moment of the generated rotational field and thus the amount of supplied electric energy, required for bringing an equal inertia mass to the required number of revolutions. By such switching-over operation the possible range of measurement may be considerably increased; this is important, in particular with regard to the fact, that the mass which has to be set in rotation consists not only of the changeable weights but also of the mass of the armature itself and the components connected thereto, which mass cannot be reduced under a certain limit.

According to another embodiment of the invention the pole extensions may be entirely omitted and the rotational field generated merely by coils with axially extending conductors, set in rotation.

In order that the invention may be readily understood and carried into effect, several examples will now be described with reference to the accompanying drawings, wherein Fig. 1 represents in longitudinal section an embodiment of the invention, Fig. 2 the corresponding plan view, Fig. 3 shows a connection diagram of one embodiment, Fig. 4 a modified connection diagram, Fig. 5 represents in a longitudinal section another embodiment of the invention, Fig. 6 is a sectional view taken along the line VI—VI of Fig. 5 and Fig. 7 is an elevational view of one of the cores of a coil.

Referring first to Fig. 1 an armature 6, which has to be set in rotation, is mounted on a shaft, journalled in bearings 7. The shaft of the armature 6 carries further a braking disc 8 adapted for cooperation with a braking block 9 operated by an electromagnet 10. The armature shaft carries further a centrifugal governor 11, which after a predetermined angular velocity has been reached, closes the contacts 12. The armature shaft is further provided with a removable and changeable flywheel 13. This flywheel is arranged to be completed or replaced by one or more supplemental flywheels 13' which could be laid on the flywheel 13 or directly on a shoulder of the shaft of the armature 6. In the device shown the shaft is mounted vertically.

A stationary ring 44 surrounds the armature 6, said ring consisting preferably of superposed sheet metal rings made of dynamo steel. Pole extensions 45 are provided between the armature 6 and ring 44, said pole extensions being supported e. g. on a cup 46 driven by an electromotor 5, rotating permanently with uniform velocity. The cup 46 is provided with rings 2 and cooperating brushes 1 for the supply of electric current. The pole extensions 45 are held together by an upper ring 47. Magnetising coils 3 are mounted on the pole extensions 45, said coils being connected in a suitable way with the rings 2. Magnetic material is used for the pole extensions 45 only, so that the residual magnetism remaining therein is negligible with respect to the very small mass of the extensions. At the beginning of the operation which may include the heating of an article to be hardened, i. e. at the beginning of the supply of energy, measuring current is being applied from a source 131 by means of the rings 2 to the winding 3 of the system rotating with uniform velocity. The electromagnet 10 is simultaneously energised, withdrawing the braking block 9 from the braking disc 8. The armature 6 is entrained by the rotating system 45, 46, 47 and after a suitable speed of rotation, i. e. a suitable angular velocity has been reached, the centrifugal governor 11 closes the contact 12 which interrupts through intermediary of relays 132, 133 the supply of energy from source 131 to brushes 1 and thus cuts off the measuring current. The electromagnet 10 is simultaneously de-energized so that the braking block 9 is applied on the disc 8. At the same time a quenching spray is brought into operation in order to perform the hardening steps of the previously heated article.

The speed of rotation of the armature decreases and on reaching a predetermined limit, the centrifugal switch 12 opens again the contacts thereof, said opening being now used for cutting off the supply of quenching liquid. The hardening operation is thus completed and the heating and hardening of a further piece may be started.

The quantity of supplied energy and thereby also the final temperature of the heated article may be changed by replacing the flywheel 13 by another, having a different moment of inertia. Preferably a whole set of such flywheels with different moments of inertia is provided in a way similar to the employment of different weights in a series of weights so that from a selected number of flywheels a total inertia mass, having any desired moment of inertia, corresponding to the desired amount of supplied energy, may be combined. This method of changing the quantity of the required energy by combining different flywheels, is extremely simple and may be carried out by relatively unskilled persons.

The moment of inertia may, of course, be changed also by a change of position of the mass, which is brought into rotation, with respect to the axis of rotation, for instance, by shifting a suitable weight.

The magnetic flux generated by the coils 3 in the pole extensions 45 flows naturally also through the stationary ring 44 wherein it is closed. No residual magnetism may, however, remain in the ring 45, because as shown in Fig. 2, the flux flowing from the extensions 45 into the ring 44 is divided into two circumferentially extending branches of opposite direction of flux. The pole extensions 45 being rotated, the direction of the magnetic flux in the ring 44 alternates, and no residual magnetism may therefore remain in the latter.

When using the arrangement according to the invention, two air gaps are formed, one between the ring 44 and extensions 45 and the other between the extensions and the armature 6, but the influence of these gaps may be compensated for by increasing the number of windings on the coils.

The present invention comprises an arrangement, in which the individual coils may be connected in parallel or in series by means of a suitable change-over switch. The respective diagram of connection of the coils is shown in Fig. 3. By the possibility to change-over the connection of the coils the measuring range of the device may be increased.

In the present case the rings 2 and the respective brushes 1 are carried out in quadruplicate and each beginning and end portion of each coil 3 is connected with one ring 2 respectively. A change-over switch 102 is interposed between the leads 101 for the supplying current and brushes 1, said switch serving for connecting the coils 3 in series left position of the switch, shown in dotted lines and in parallel right hand position of the switch, shown in full lines.

In a modified embodiment the change-over switch, which takes part in the rotation, may be provided between the rings and coils. In such a case the rings and brushes are provided in twos only.

A change-over switch of this kind may be adjusted when the device is at rest, e. g. by a suitable shifting fork or automatically by changing the direction of rotation of the driving motor.

Such an arrangement is shown diagrammatically in Fig. 4. The end and initial portions of coils 3 are connected with two rings 2, cooperating through brushes 1 with current supply leads, while the change-over switch connects in one position the coils 3 in series and in the other position in parallel. The prongs of the switch may be thrown over simultaneously by changing member 105, the position of which is controlled by a ring 104 mounted in stationary frictional jaws 103. When the driving electromotor is set in rotation, the frictional jaws 103 retain at first the ring 104 which changes the position of the changing member 105 and thereby of the switch 102 in the desired direction. When the direction of rotation of the electromotor 5 is reversed, the jaws 103 change the position of the ring 104 and thereby of the changing member 105 and switch 102 in oposite direction, so that by reversing the direction of rotation the change-over switch is automatically thrown into its other position.

Figs. 5, 6 and 7 show another arrangement of the rotor, in which the armature 6 is surrounded by a ring 44, leaving an air-gap between these two portions; a coil consisting of axially extending conductors 55 is mounted in the air-gap between said ring and the armature. The coil is, of course, mounted for rotation in order to generate a rotational field. This arrangement makes it possible to completely remove any residual magnetism, but the air-gap is larger in consequence of the provision of the coil 55 which makes necessary an increase in the number of the required ampere turns. The individual groups of conductors 55 may be adjusted so as to be switched over similar as the coils 3 in the embodiment according to Figs. 3 and 4 for the same purpose.

As apparent from Figs. 5 to 7, the conductors 55 have in this case the shape of two flat bent coils in cylindrical form, wound around flat cores of non-magnetic material, carried by a rotor 46 and connected on top by a reinforcing ring. The end and initial portions of the coils are connected with rings 2 cooperating by the intermediary of brushes 1 with the current supply. The conductor 55 may be e. g. flat and placed in radial direction.

In other respects the device may be arranged in a similar way as described in connection with Figs. 1 and 2 or 3 or 4.

The invention is, of course, by no means restricted to the examples shown and described, which on the contrary may be changed and modified in a variety of ways without extending the scope of the invention. So, for instance, instead of one armature 6, two such armatures could be used rotated by two cups and arrangements according to the lower part of Fig. 1, these two driving arrangements being supplied by two measuring currents. Both cups 46 will be rotated however, in an opposite direction. Such an arrangement will correspond to the arrangement according to Fig. 2 of U. S. Patent No. 2,491,340, issued December 13, 1949. Also, for instance, instead of one pair of magnetic extensions or coils, several such pairs may be used.

I claim:

1. In a device for measuring a selectively predetermined amount of electric energy, in combination a rotatable armature, a stationary ring of dynamo steel surrounding a portion of said armature but spaced therefrom, a carrier carrying in the space between the rotatable armature and the stationary ring an even number of pole pieces, provided with magnetizing windings, terminals for interconnection of these windings to an electric source, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

2. In a device for measuring a selectively predetermined amount of electric energy, in combination, a rotatable armature, a stationary ring of dynamo steel surrounding a portion of said armature but spaced therefrom, a carrier carrying in the space between the rotatable armature and stationary ring an even number of pole pieces provided with magnetizing windings, a change-over switch for connecting such windings in parallel or series, terminals for interconnection of these windings to an electric source, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

3. In a device for measuring a selectively predetermined amount of electric energy, in combination, a rotatable armature, a stationary ring of dynamo steel surrounding a portion of said armature but spaced therefrom, a non-magnetic carrier, carrying in the space between the rotatable armature and the stationary ring axially extending conductors and terminals for interconnection of these conductors to an electric source, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

4. In a device for measuring a selectively predetermined amount of electric energy, in combination, a rotatable armature, a stationary ring, surrounding a portion of said armature, but spaced therefrom, a non-magnetic carrier, carrying in the space between the rotatable armature in the stationary ring an even number of cores of non-magnetic material, an even number of flat curved windings, wound on such cores, and terminals for interconnection of such windings to an electric source, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

5. In a device for measuring a selectively predetermined amount of energy, in combination, a rotatable armature, a stationary ring surrounding a portion of said armature, but spaced therefrom, a non-magnetic carrier, carrying in the space between the rotatable armature in the stationary ring an even number of cores of non-magnetic material, an even number of flat curved windings wound on such cores, a change-over switch for connecting such windings in parallel or series, terminals for interconnection of these windings to an electric source, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

6. In a device for measuring a selectively predetermined amount of electric energy, in combination, a rotatable armature, a stationary ring of dynamo steel surrounding a portion of said armature but spaced therefrom, a carrier carrying in the space between the rotatable armature and the stationary ring an even number of pole pieces, provided with magnetizing windings and a double number of rings than the number of such windings, each initial and end portion of each winding being connected with one ring, a brush cooperating with each ring for interconnection of the windings to an electric source, a change-over switch for connecting such windings in parallel or series connected between the brushes and the electric source, means connected to said carrier for revolving the same about the axis to the armature, whereby said armature may be rotated about its axis while current passes through said windings, means connected with said armature for selectively adjusting the angular acceleration thereof, and means actuable by said armature for interrupting the supply of energy to the device.

7. In a device for measuring a selectively predetermined amount of electric energy, in combination, a rotatable armature, a stationary ring surrounding a portion of said armature but spaced therefrom, a non-magnetic carrier, carrying in the space between the rotatable armature in the stationary ring, an even number of cores, an even number of flat curved windings wound on such cores and a double number of rings than the number of windings each initial and end portion of each winding being connected with one ring, a brush cooperating with each ring for interconnection of the windings to an electric source, a change-over switch for connecting such windings in parallel or series being connected between the brushes and the electric source, means connected to said carrier for revolving the same about the axis to the armature, whereby said armature may be rotated about its axis while current passes through said windings, means connected with said armature for selectively adjusting the angular acceleration thereof and means actuable by said armature for interrupting the supply of energy to the device.

8. In a device for measuring a selectively predetermined amount of electric energy in combination, a rotatable armature, a stationary ring of dynamo steel surrounding a portion of said armature but spaced therefrom, a carrier carrying in the space between the rotatable armature and the stationary ring an even number of pole pieces, provided with magnetized windings, two rings cooperating with two brushes, connected to an electric source, a change-over switch for connecting such windings in parallel or series being connected between the windings and rings, means connected to said carrier for revolving the same about the axis of the armature whereby said armature may be rotated about its axis while current passes through said windings, means connected with said armature for selectively adjusting the angular acceleration thereof and means actuable by said armature for interrupting the supply of energy to the device.

9. In a device for measuring a selectively predetermined amount of electric energy, in combination, a rotatable armature, a stationary ring surrounding a portion of said armature but spaced therefrom, a non-magnetic carrier, carrying in the space between the rotatable armature in the stationary ring, an even number of cores, an even number of flat curved windings wound on such cores, two rings cooperating with two brushes connected to an electric source, a change-over switch for connecting such windings in parallel or series being connected between the windings and rings, means connected to said carrier for revolving the same about the axis of the armature, whereby said armature may be rotated about its axis while current passes through said windings, means adjusting the angular acceleration thereof, and means actuable by said armature for interrupting the supply of energy to the device.

10. In a device for measuring a selectively predetermined amount of electric energy, in combination, a rotatable armature, a stationary ring of dynamo steel surrounding a portion of said armature but spaced therefrom, a carrier carrying in the space between the rotatable armature and the stationary ring an even number of pole pieces, provided with magnetizing windings, two rings cooperating with two brushes, connected to an electric source, a change-over switch for connecting such windings in parallel or series being connected between the windings and rings, means for automatic throwing over of the change-over switch when changing the direction of rotation of the carrier, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

11. In a device for measuring a selectively predetermined amount of electric energy, in combination, a rotatable armature, a stationary ring surrounding a portion of said armature but spaced therefrom, a non-magnetic carrier, carrying in the space between the rotatable armature in the stationary ring, an even number of cores, an even number of flat curved windings wound on such cores, two rings cooperating with two brushes, connected to an electric source, a change-over switch for connecting such windings in parallel or series being connected between the windings and rings, means for automatic throwing over of the change-over switch when changing the direction of rotation of the carrier, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

12. In a device for measuring a selectively predetermined amount of electric energy in combination, a rotatable armature, a stationary ring of dynamo steel surrounding a portion of said armature but spaced therefrom, a carrier carrying in the space between the rotatable armature and the stationary ring an even number of pole pieces, provided with magnetizing windings, two rings cooperating with two brushes, connected to an electric source, a change-over switch for connecting such windings in parallel or series being connected between the windings and rings, stationary frictional jaws, a frictional ring journalled in the carrier and cooperating with such frictional jaws, this ring being retained by these frictional jaws when the rotor is set in rotation, the frictional ring throwing over therefore, the change-over switch when changing the direction of the rotation of the carrier, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

13. In a device for measuring a selectively predetermined amount of electric energy, in combination, a rotatable armature, a stationary ring surrounding a portion of said armature but spaced therefrom, a non-magnetic carrier, carrying in the space between the rotatable armature in the stationary ring, an even number of cores, an even number of flat curved windings wound on such cores, two rings cooperating with two brushes connected to an electric source, a change-over switch for connecting such windings in parallel or series being connected between the windings and rings, stationary frictional jaws, a frictional ring journalled in the carrier and cooperating with such frictional jaws, this ring being retained by these frictional jaws when the rotor is set in rotation, the frictional ring throwing over, therefore, the change-over switch when changing the direction of the rotation of the carrier, means connected to said carrier for revolving the same about the axis of the armature, whereby said armature may be rotated about its axis while current passes through said windings, means connected with said armature for selectively adjusting the angular acceleration thereof, and means actuable by said armature for interrupting the supply of energy to the device.

JIŘÍ STIVÍN.

REFERENCES CITED

The following references are of record in the file of this patent:

UNITED STATES PATENTS

| Number | Name | Date |
|---|---|---|
| 1,246,643 | Neuland | Nov. 13, 1917 |
| 1,773,842 | Neuland | Aug. 26, 1930 |